(12) United States Patent
Mesnage et al.

(10) Patent No.: US 12,316,123 B2
(45) Date of Patent: May 27, 2025

(54) POWER TRANSFER SYSTEM BETWEEN AN AC NETWORK AND A REVERSIBLE HYDRAULIC TURBINE

(71) Applicant: SUPERGRID INSTITUTE, Villeurbanne (FR)

(72) Inventors: Hugo Mesnage, Lyons (FR); Renaud Guillaume, Lyons (FR); Loïc Leclere, Lyons (FR); Florent Morel, Lyons (FR); Florian Errigo, Lyons (FR)

(73) Assignee: SUPERGRID INSTITUTE, Villeurbanne (FR)

( * ) Notice: Subject to any disclaimer, the term of this patent is extended or adjusted under 35 U.S.C. 154(b) by 60 days.

(21) Appl. No.: 18/003,777

(22) PCT Filed: Jun. 30, 2021

(86) PCT No.: PCT/EP2021/067966
§ 371 (c)(1),
(2) Date: Dec. 29, 2022

(87) PCT Pub. No.: WO2022/003008
PCT Pub. Date: Jan. 6, 2022

(65) Prior Publication Data
US 2023/0238804 A1 Jul. 27, 2023

(30) Foreign Application Priority Data
Jun. 30, 2020 (FR) ........................................ 2006852

(51) Int. Cl.
*H02J 3/32* (2006.01)
*H02J 3/38* (2006.01)
*H02M 7/66* (2006.01)

(52) U.S. Cl.
CPC ................ *H02J 3/38* (2013.01); *H02J 3/32* (2013.01); *H02M 7/66* (2013.01); *H02J 2207/50* (2020.01); *H02J 2300/30* (2020.01)

(58) Field of Classification Search
CPC .. H02J 3/38; H02J 3/32; H02J 2207/50; H02J 2300/30; H02J 3/08; H02M 7/66; Y02E 10/20; F03B 15/005
(Continued)

(56) References Cited

U.S. PATENT DOCUMENTS 4,743,827 A * 5/1988 Shiozaki ............... H02J 15/003
318/798
4,788,635 A * 11/1988 Heinrich ................. H02P 3/18
318/803

(Continued)

FOREIGN PATENT DOCUMENTS

| EP | 0313096 A1 | 4/1989 |
| GB | 2169160 A | 7/1986 |
| JP | H0332399 A | 2/1991 |

OTHER PUBLICATIONS

International Search Report issued on Sep. 16, 2021 in corresponding Application No. PCT/EP2021/067966, 4 pages.

*Primary Examiner* — Elim Ortiz
(74) *Attorney, Agent, or Firm* — Maier & Maier, PLLC

(57) ABSTRACT

A power transfer system includes a first branch including a controlled switch and a second branch including a variable frequency converter, in parallel between an AC network and a reversible pump-turbine, the variable frequency converter includes: a first AC/DC converter having a first DC interface, and a second AC/DC converter having a second DC interface, the first and second DC interfaces being connected by a DC link, a control circuit having a first mode wherein it simultaneously opens the switch and it transfers electrical power until it reaches the same frequency on two AC (Continued)

interfaces, and having a second mode wherein it closes the switch of the first branch; an energy storage system; and a switching system for selectively connecting the energy storage system to the DC link.

13 Claims, 12 Drawing Sheets

(58) Field of Classification Search
USPC ............ 307/24, 43, 64, 66, 82, 84; 700/295, 700/286, 287; 290/44; 365/35
See application file for complete search history.

(56) References Cited

U.S. PATENT DOCUMENTS

| | | | |
|---|---|---|---|
| 2013/0141950 A1* | 6/2013 | Xiao | ........................ H01F 3/12 |
| | | | 363/35 |
| 2017/0310232 A1 | 10/2017 | De Hoog et al. | |
| 2019/0186458 A1 | 6/2019 | Obermeyer | |
| 2020/0366098 A1* | 11/2020 | Ganireddy | ............ H02M 3/158 |

\* cited by examiner

[Fig. 1]
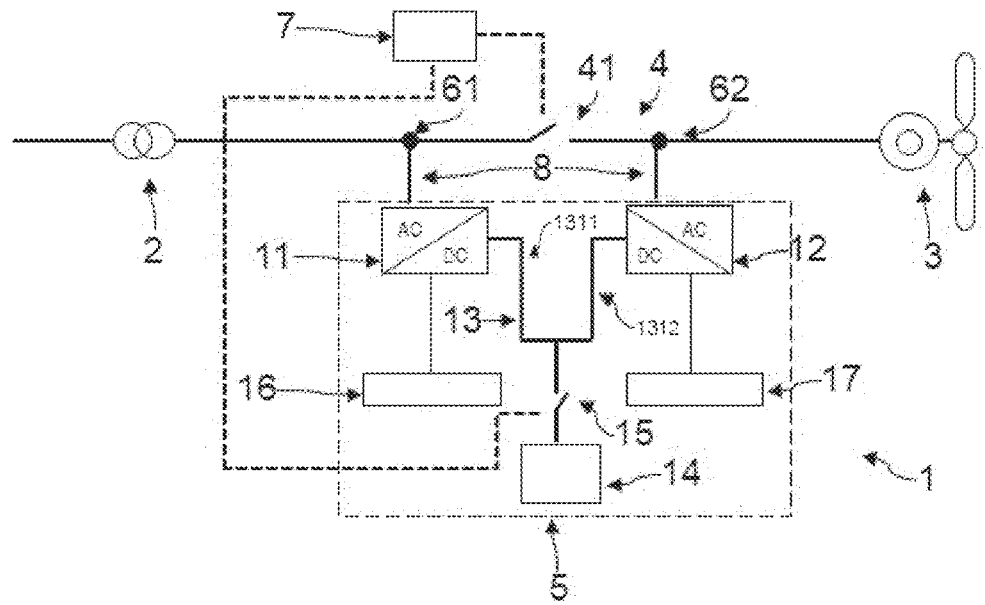
[Fig. 2]
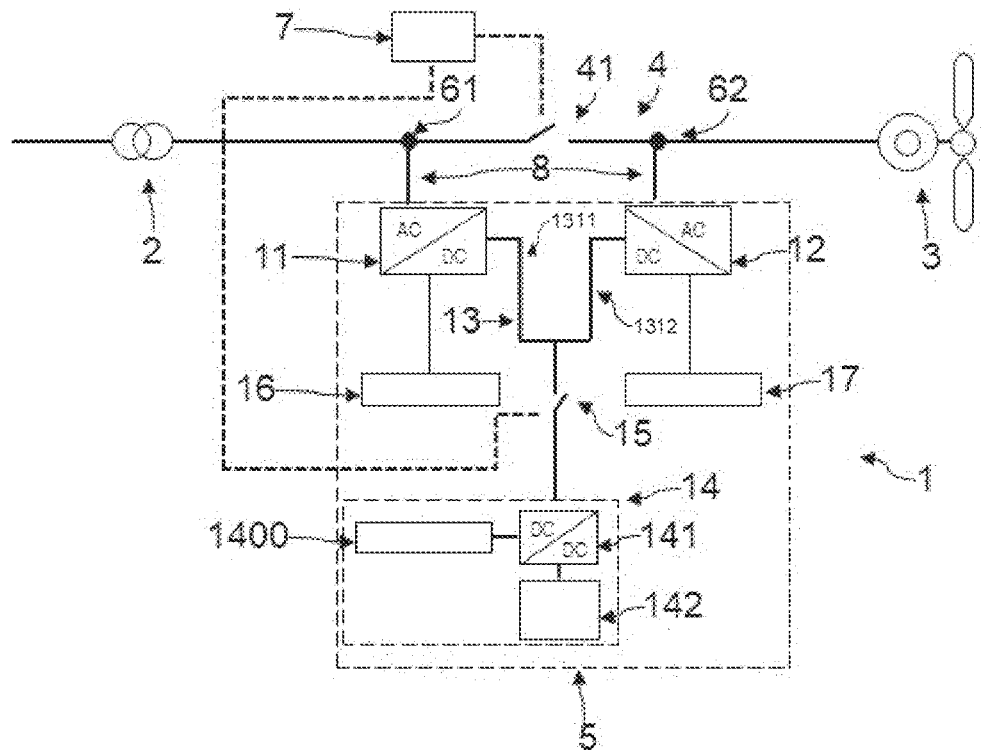

[Fig. 3]
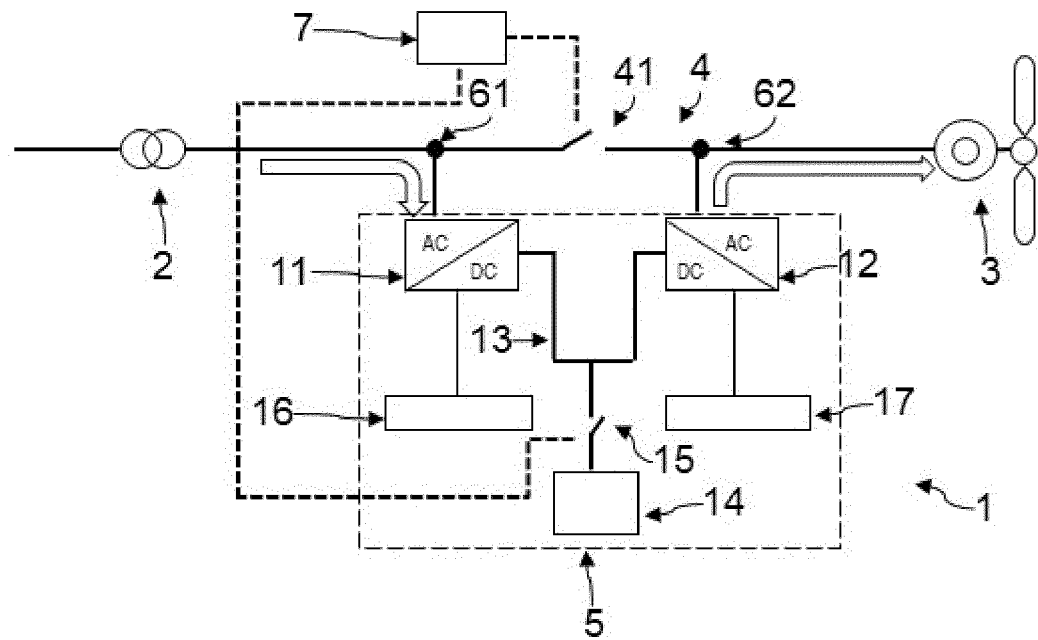
[Fig. 4]
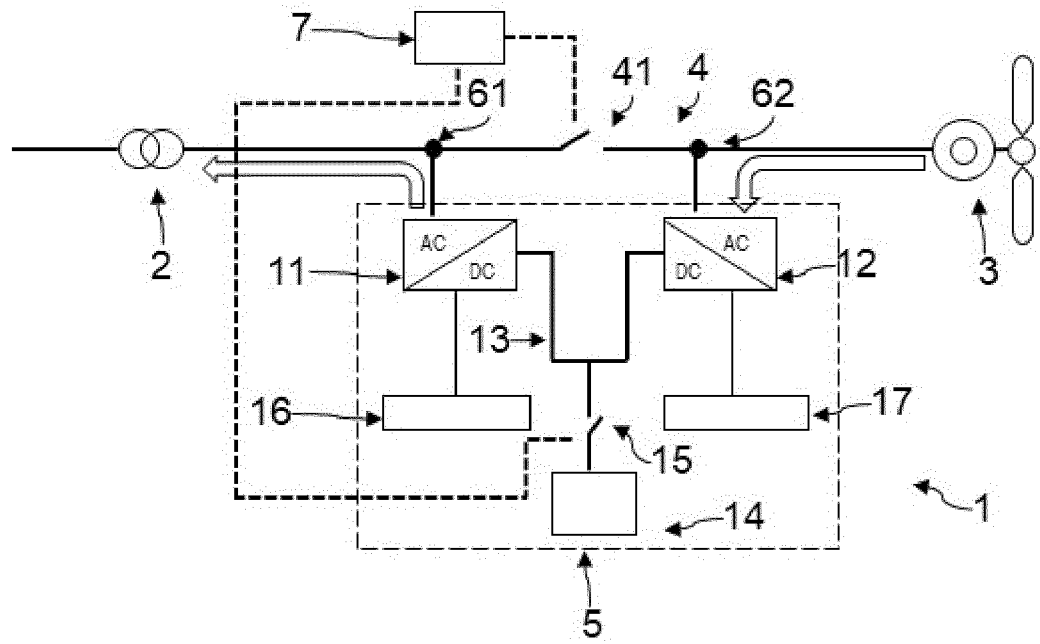

[Fig. 5]
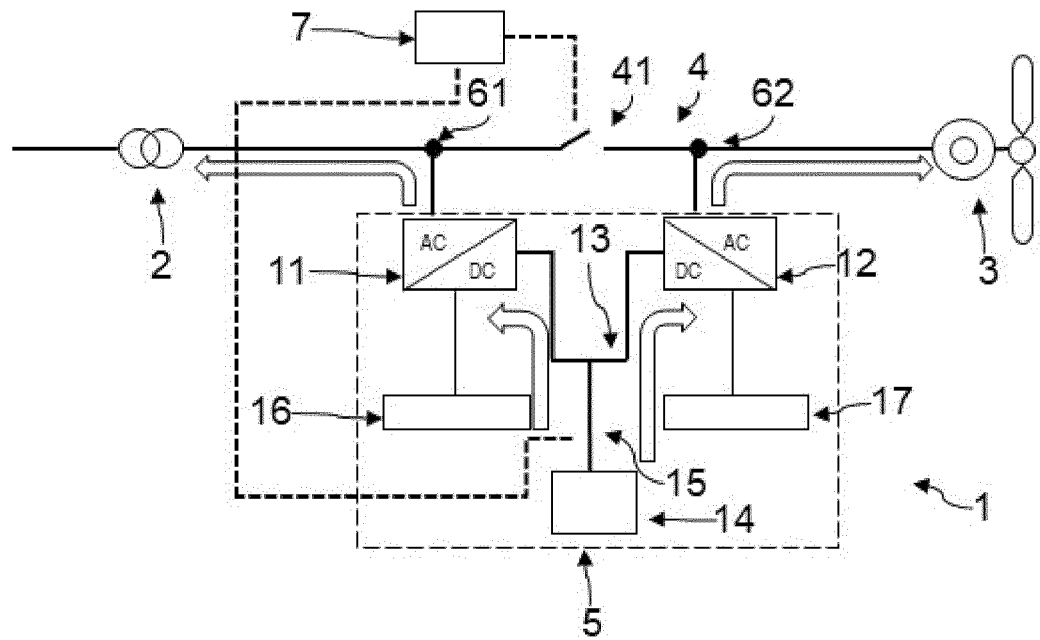
[Fig. 6]
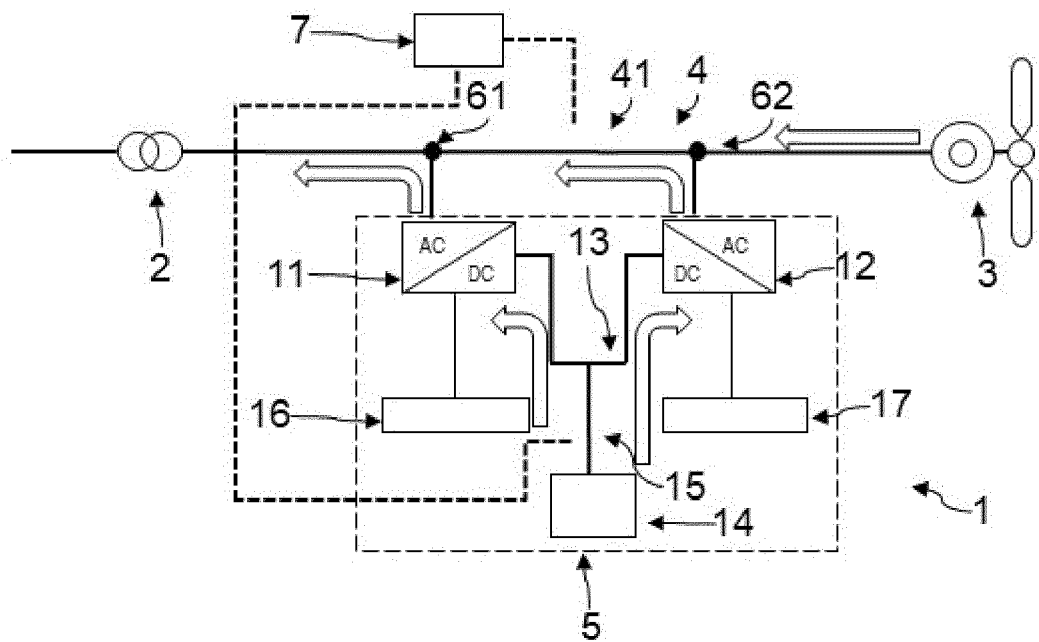

[Fig. 7]
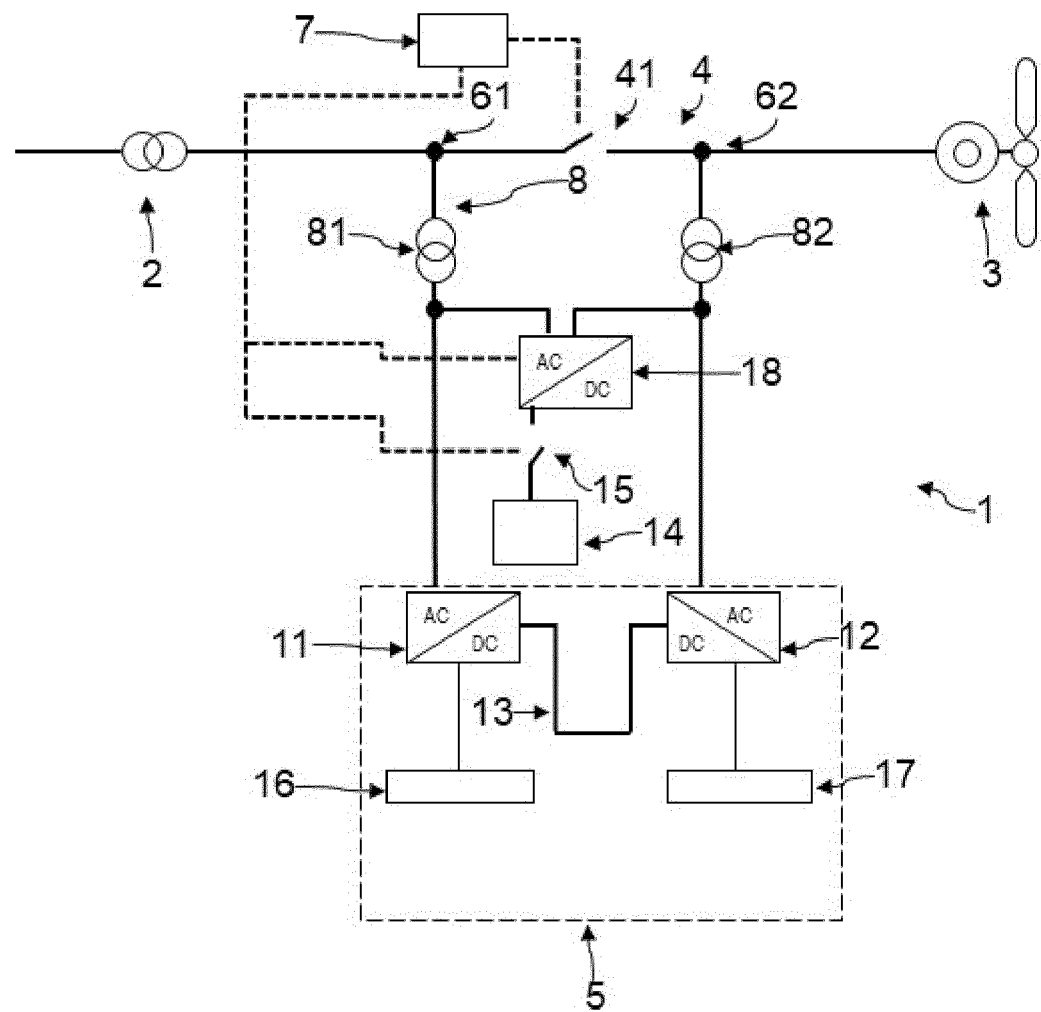

[Fig. 8]
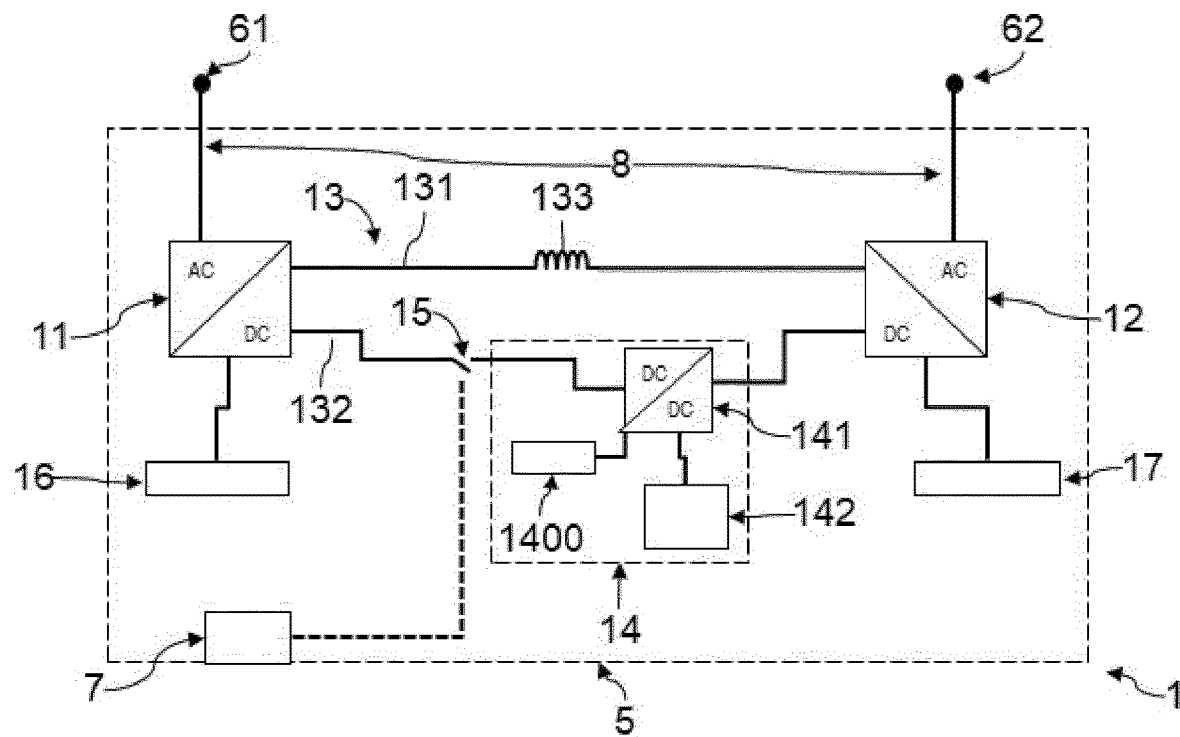
[Fig. 9]
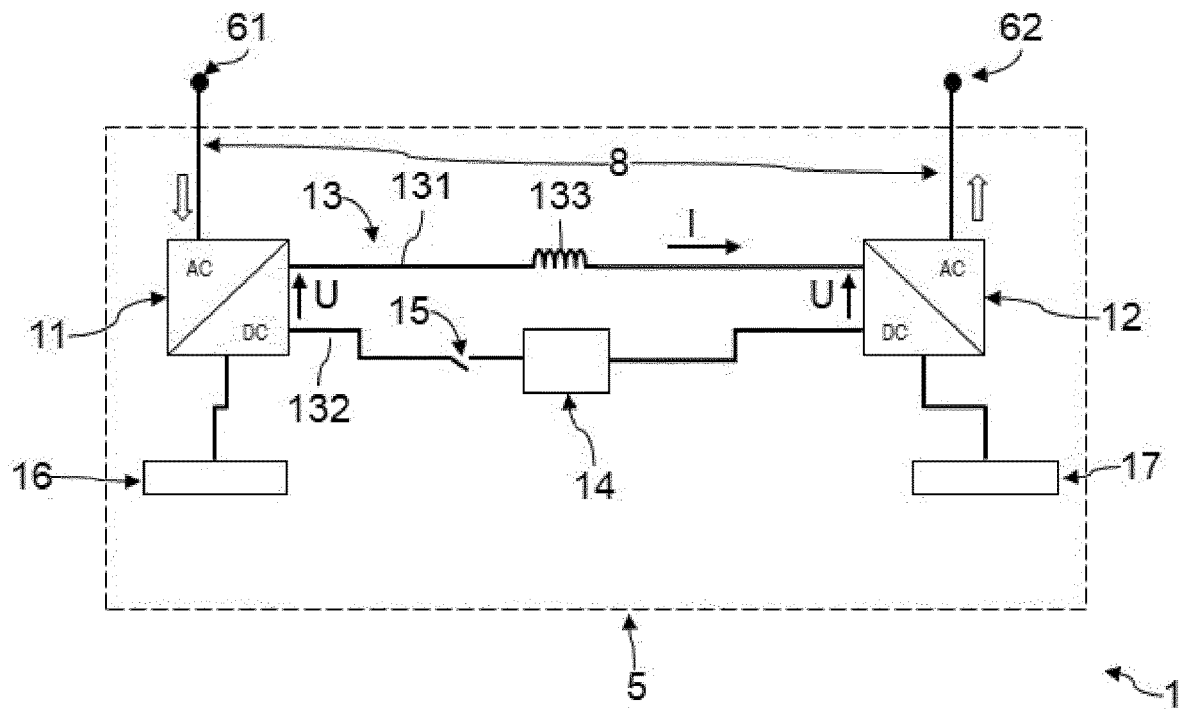

[Fig. 10]
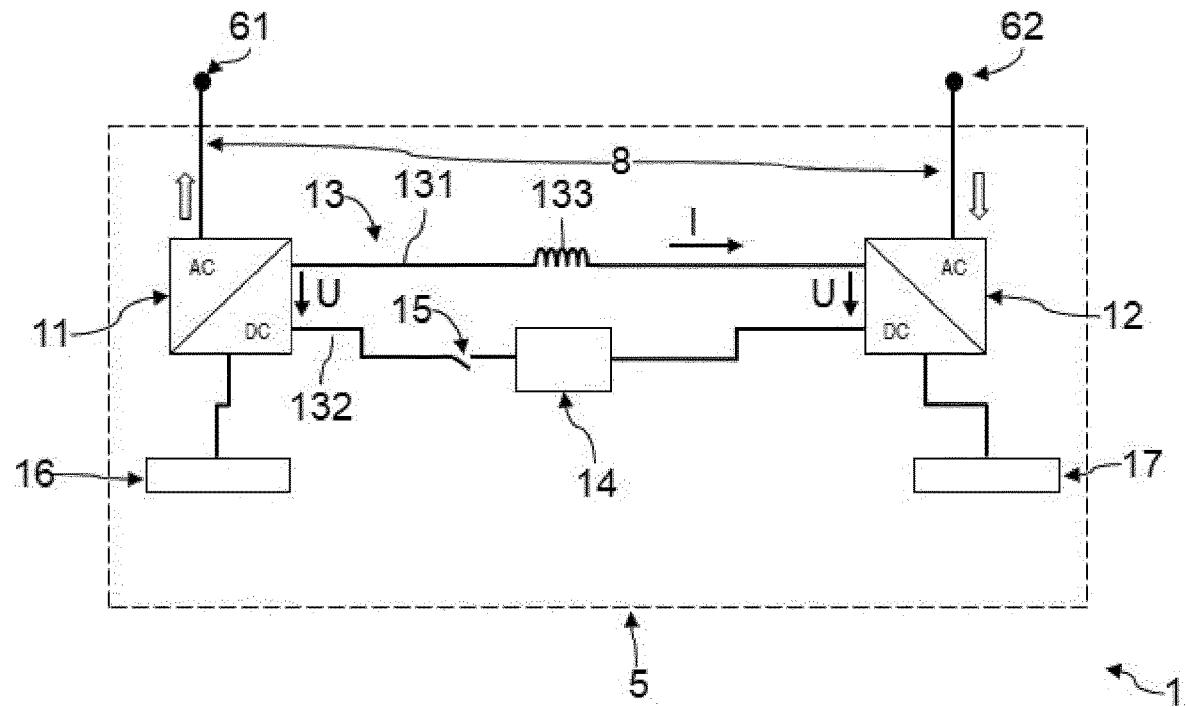
[Fig. 11]
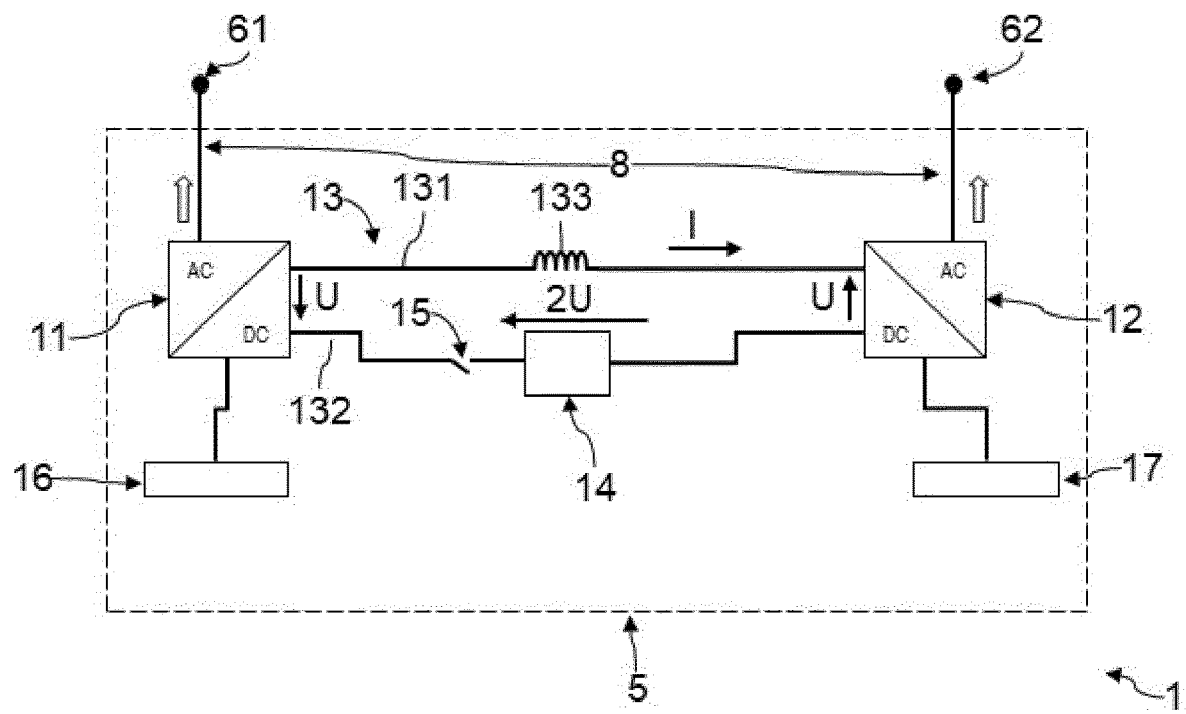

[Fig. 12]
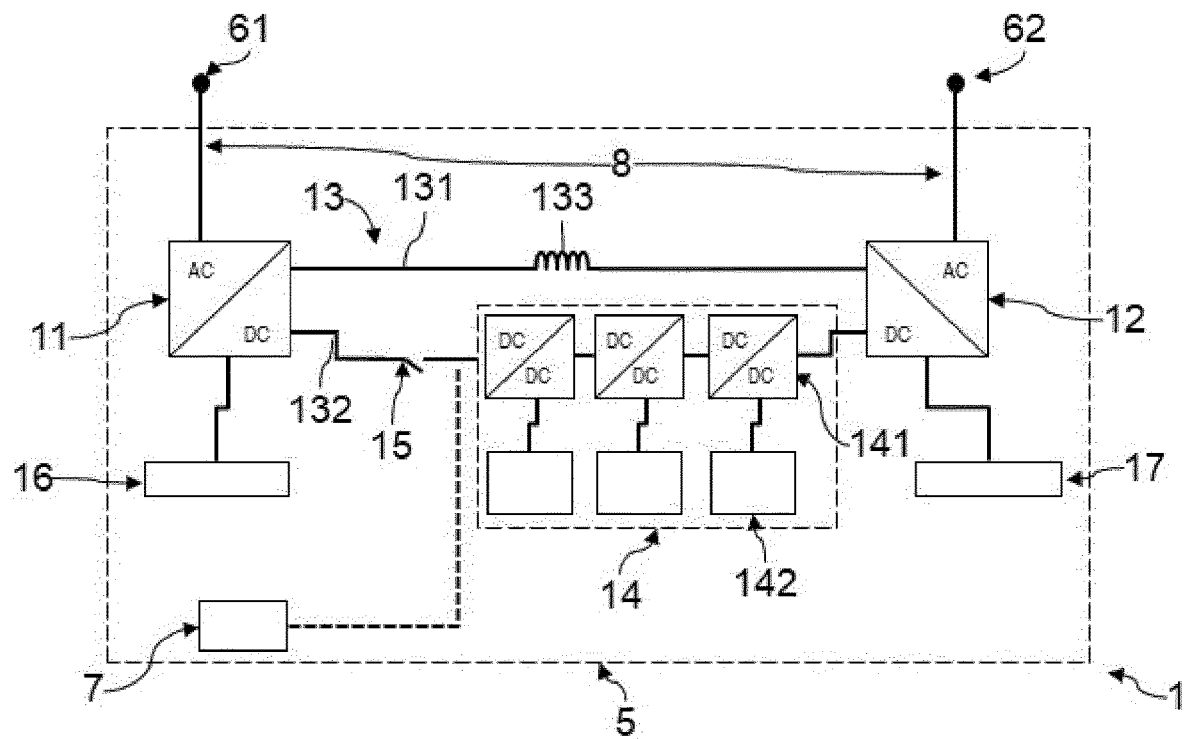
[Fig. 13]

[Fig. 14]
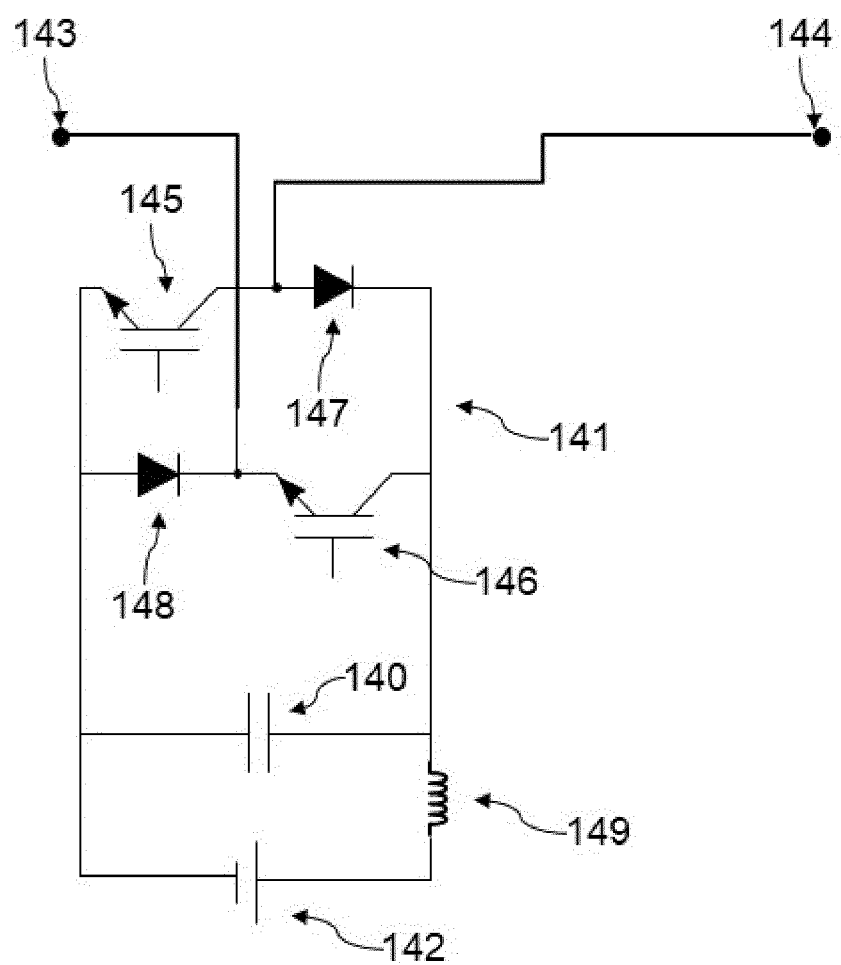

[Fig. 15]
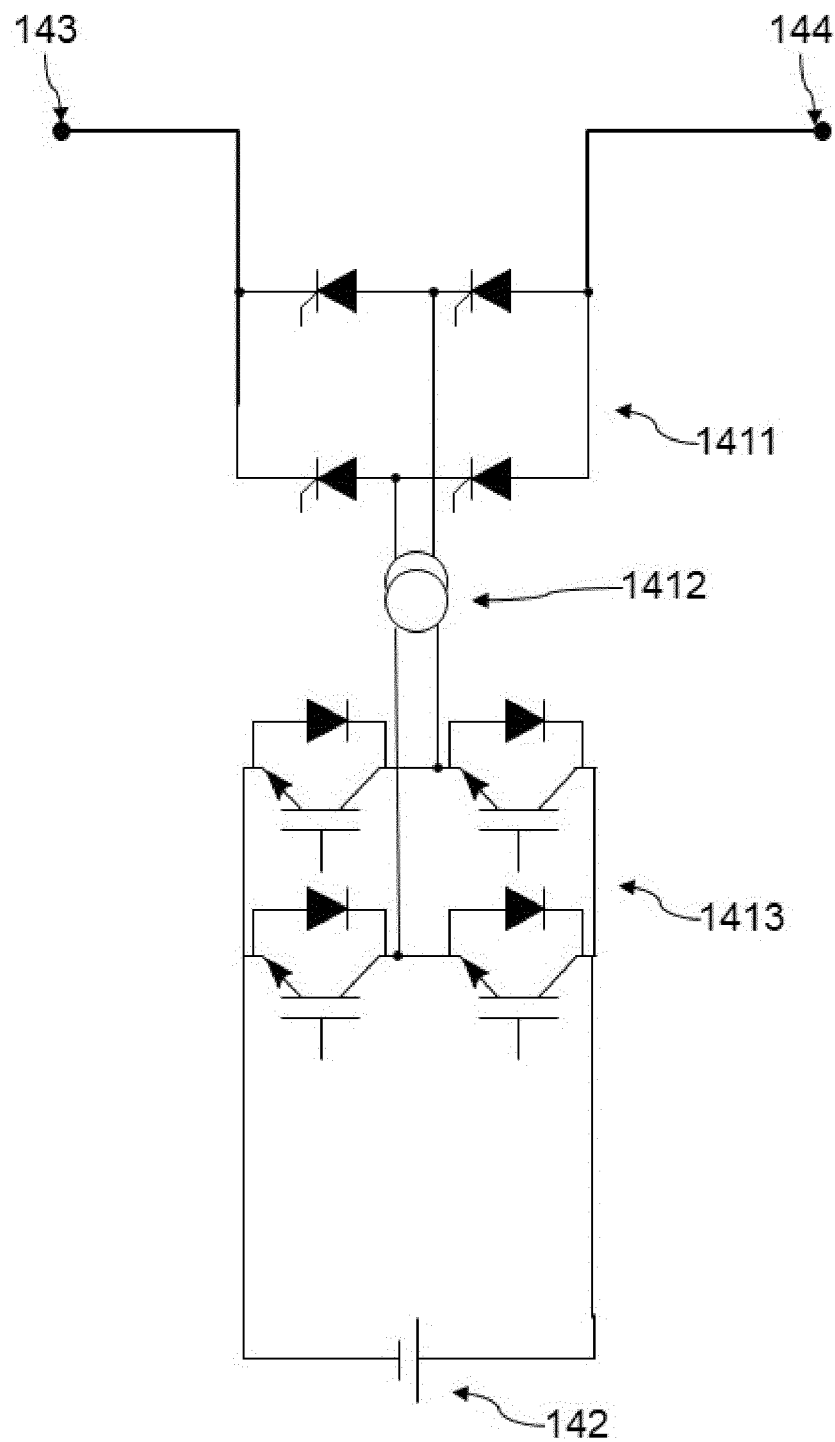

[Fig. 16]
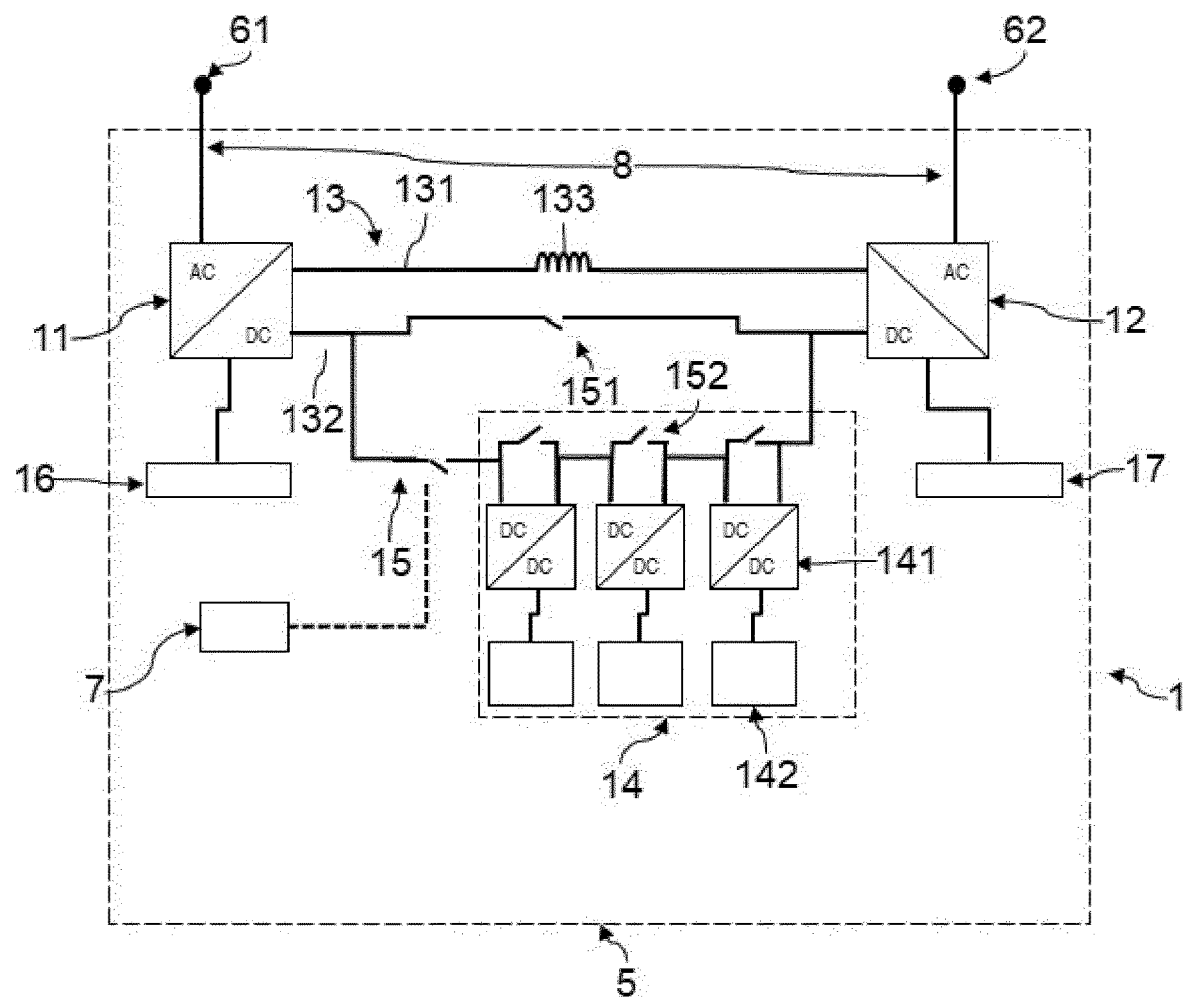

[Fig. 17]
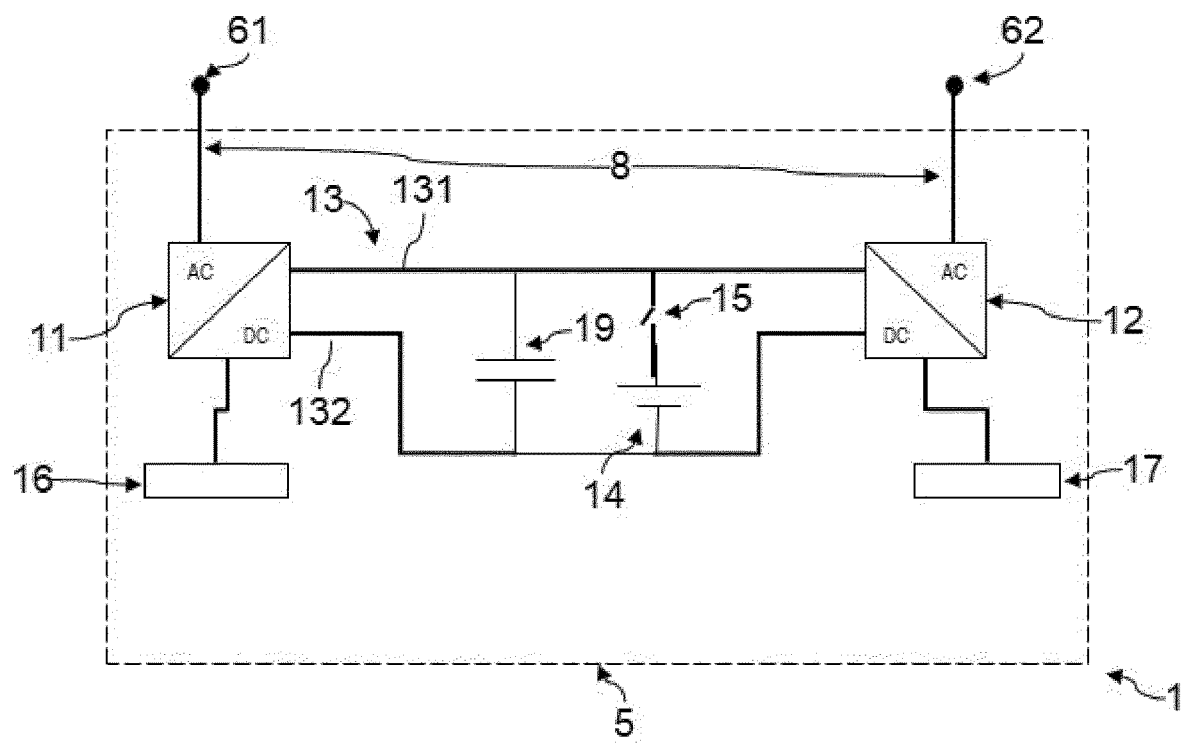

[Fig. 18]
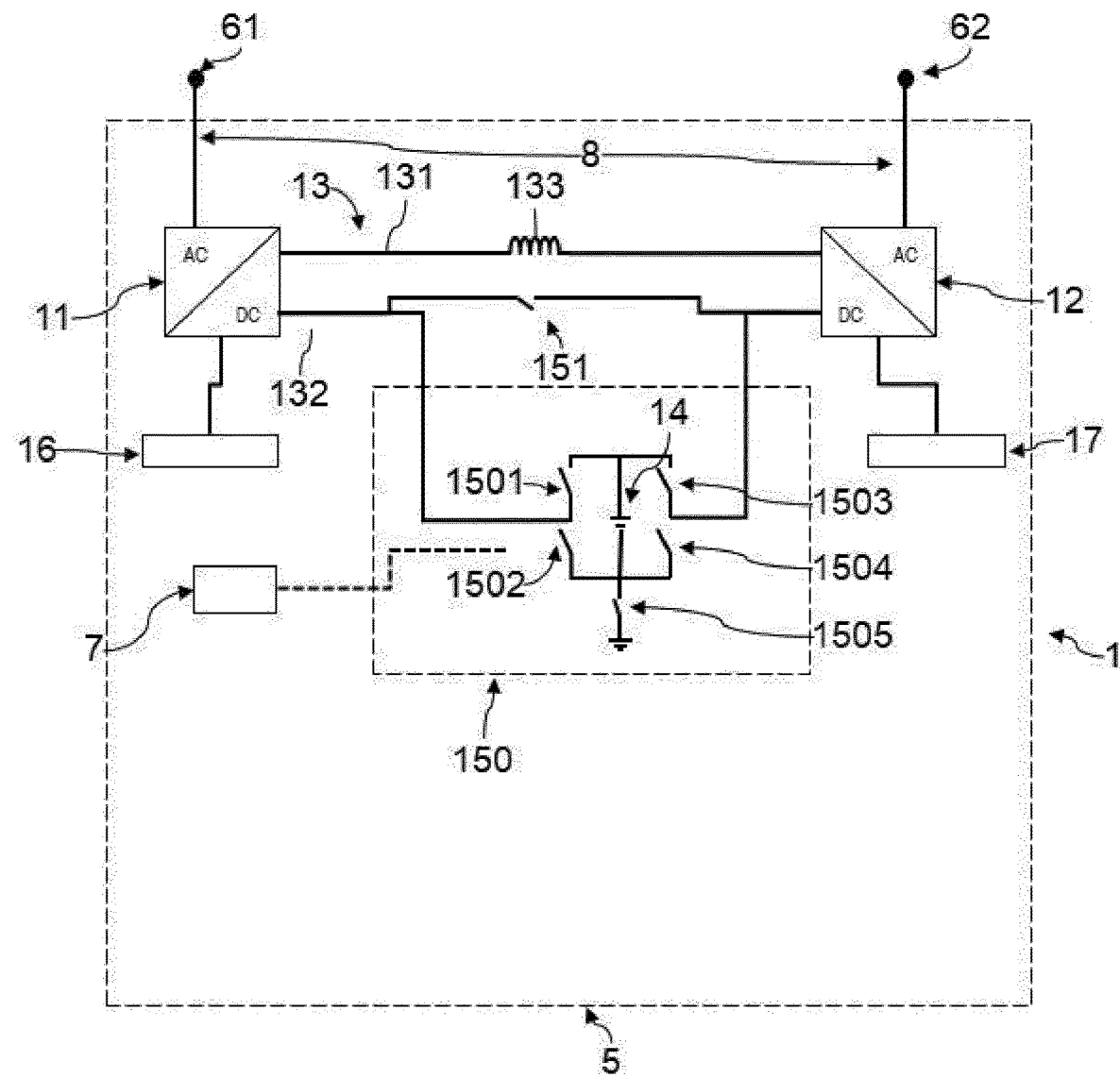

POWER TRANSFER SYSTEM BETWEEN AN AC NETWORK AND A REVERSIBLE HYDRAULIC TURBINE

FIELD

The invention relates to the power transfer between an AC network and a reversible hydraulic turbine. In particular, the invention relates to the use of a system allowing the start up of the turbine in pump mode.

BACKGROUND

Many hydroelectric dams include a reversible pump-turbine used either in pump mode to drive water above the dam, or in turbine mode to generate electrical power transferred to an AC network. A known power transfer system comprises a first branch and a second branch connected in parallel to form a power link between the AC network and the reversible pump-turbine. The first branch comprises a controlled switch. When the controlled switch is closed, a nominal electrical power can be exchanged between the AC network and the pump-turbine, in order to reduce the electrical losses in the power link. To start the pump-turbine in pump mode, this pump-turbine initially has a null speed and has to be accelerated until it reaches the AC network synchronization speed. Therefore, the second branch comprises a variable frequency converter comprising first and second AC/DC converters. The AC interfaces of these AC/DC converters are connected respectively to the AC network and to the pump-turbine. The controlled switch is initially open. The variable frequency converter transfers power to the pump-turbine until it reaches the AC network synchronization speed. The controlled switch is then closed once this synchronization speed is reached.

In addition, this power transfer system can also include a hybridization system that comprises an AC/DC converter connected to the power link and an energy storage system connected to the DC interface of the AC/DC converter. This energy storage system is a reversible DC source which is able to store electrical energy from the AC network and feed energy back into the AC network via the AC/DC converter. This hybridization system brings more flexibility to the power transfer system for instance by storing energy generated by the pump-turbine if the AC network requests transitorily less power. Such a hybridization system provides a better dynamic adaptation to the power requirements.

SUMMARY

However, using a hybridization system is costly, which limits its commercial development. The invention aims to solve one or more of these drawbacks. The invention thus relates to a power transfer system, such as defined in appended claim 1.

The invention also relates to the variants highlighted in the dependent claims. A person skilled in the art will understand that each of the features of the description or of the dependent claims may be combined independently with the features of an independent claim, but without constituting an intermediate generalization.

The invention also relates to a method for managing a power transfer system, as highlighted in the appended claims.

The invention also relates to a hydraulic system, comprising:

a power transfer system as highlighted in the appended claims,
an AC network connected to the first connection interface of the power transfer system
a reversible pump-turbine connected to the second connection interface of the power transfer system.

BRIEF DESCRIPTION OF THE DRAWINGS

Other features and advantages of the invention will become clearer from the description thereof given hereunder, as a guide and in an entirely non-limiting manner, referring to the appended drawings, in which:

FIG. 1 is a schematic representation of a power transfer system according to a first embodiment of the invention;

FIG. 2 is a schematic representation of a power transfer system according to a second embodiment of the invention;

FIG. 3 illustrates one operating mode of a power transfer system according to the first embodiment, during a starting phase of the reversible pump-turbine;

FIG. 4 illustrates another operating mode of a power transfer system according to the first embodiment, in which the electrical power provided by the reversible pump-turbine is bypassing a main switch;

FIG. 5 illustrates another operating mode of a power transfer system according to the first embodiment, in which the energy storage system restores energy both to the AC network and to the reversible pump-turbine in a different starting mode;

FIG. 6 illustrates another operating mode of a power transfer system according to the first embodiment, during a phase where both the reversible pump-turbine and the energy storage system send power to the AC network;

FIG. 7 is a schematic representation of a power transfer system according to an independent aspect of the invention;

FIG. 8 is a schematic representation of a power transfer system according to a third embodiment of the invention;

FIG. 9 illustrates an operating mode of the power transfer system according to the third embodiment;

FIG. 10 illustrates an operating mode of the power transfer system according to the third embodiment;

FIG. 11 illustrates an operating mode of the power transfer system according to the third embodiment;

FIG. 12 is a schematic representation of an improvement of the power transfer system according to FIG. 8;

FIG. 13 illustrates the structure of a DC/DC converter usable for an energy storage device embedded in the third embodiment;

FIG. 14 illustrates another DC/DC converter usable for an energy storage device of the third embodiment;

FIG. 15 illustrates another DC/DC converter usable for an energy storage device of the third embodiment;

FIG. 16 is a schematic representation of an improvement of the power transfer system according to FIG. 12;

FIG. 17 is a schematic representation of a power transfer system according to a fourth embodiment of the invention;

FIG. 18 is a schematic representation of a power transfer system according to a fourth embodiment of the invention.

DETAILED DESCRIPTION OF THE EMBODIMENTS

FIG. 1 is a schematic representation of a power transfer system 1 according to a first embodiment of the invention. The power transfer system 1 includes a controlled switch 41, a variable frequency converter 5, a connection interface 61 and another connection interface 62. A power link includes a main power branch 4 and a secondary power branch 8. The power branches 4 and 8 are connected in parallel between the connection interfaces 61 and 62. Branch 4 includes the controlled switch 41. Switch 41 can be a HVAC circuit breaker. Branch 8 comprises the variable frequency converter 5. The connection interface 61 is connected to an AC network 2, typically a 3 phased AC network. The connection interface 62 is connected to a pump-turbine 3, including typically a synchronous motor/generator. The pump-turbine 3 typically includes a hydraulic unit having a hydraulic wheel coupled to a rotor of the generator by a shaft.

The variable frequency converter 5 includes an AC/DC converter 11, a DC link 13, a controlled switch 15, an energy storage system (commonly designated by the acronym ESS) 14 and another AC/DC converter 12.

The AC interface of the AC/DC converter 11 is connected to the connection interface 61 and the AC interface of the AC/DC converter 12 is connected to the connection interface 62. The AC/DC converters 11 and 12 are reversible in current. The DC link 13 electrically connects the respective DC interfaces of the AC/DC converters 11 and 12, to allow a power transfer between these DC interfaces.

The power transfer system 1 includes a control circuit 7 configured for controlling the switch 41 and the switch 15 of the variable frequency converter 5. The control circuit 7 therefore controls the power transfer through the main branch 4, and the power transfer from/to the energy storage system 14. The main switch 41 allows to selectively connect/disconnect the AC interfaces 61 and 62 of the AC/DC converters 11 and 12, or the power interface of the motor of the pump-turbine 3 and the AC network 2.

The control circuit 7 notably has a control mode wherein it simultaneously opens the switch 41 of the main branch 4 and it transfers electrical power from the connexion interface 61 to the connexion interface 62 through the secondary branch 8, with an increasing frequency on the connexion interface 62, until it reaches the frequency on the interface 61. The control circuit 7 also has another control mode wherein it closes the switch 41 of the main branch 4 to allow a power transfer between the AC network 2 and the pump-turbine 3.

The invention allows an integration of the energy storage system 14 with a reduced cost, in order to benefit from an efficient energy transfer with the power link. Indeed, the energy storage system 14 connected to the DC link 13 shares the AC/DC converters 11 and 12 with the variable frequency converter 5, instead of having a dedicated AC/DC converter connected to the power link. Thus, the variable frequency converter 5 can be used to transfer power to the power link even outside of pump starting periods. Thereby, the power transfer system 1 can provide improved features without significantly increasing its costs.

The invention is particularly advantageous with a startup variable frequency converter 5 for which the AC/DC converters 11 and 12 have typically nominal powers lower than 20% of the nominal power of the switch 41, preferentially lower than 15% of this nominal power, and more preferentially lower than 10% of this nominal power. Such a variable frequency converter 5 can thereby remain cost effective and keep a reduced size. The nominal power of the switch 41 is usually determined based on the current rating of this switch.

The DC link 13 can include a filtering circuit. The filtering circuit can include small sized capacitors, not represented in the figures, capable of storing energy to help to stabilize the voltage of the DC link 13. The controlled switch 15 selectively connects the energy storage system 14 and the DC link 13. The variable frequency converter 5 also includes a control circuit 16 and a control circuit 17 (that can be embodied as a global controller). The control circuit 16 is configured to control the AC/DC converter 11, especially when the AC/DC converter 11 comprises active components such as thyristors belonging to a rectifier. The control circuit 17 is also configured to control the AC/DC converter 12. The control circuits 16 and 17 can be used to control the power flows between the energy storage system 14, the AC network 2 and the reversible pump-turbine 3. Control circuits 7, 16 and 17 can be based on circuits which contain intelligent components (microcontroller, DSP, ASIC, . . . ). These control circuits can retrieve the production mode information of the hydraulic unit, or states related to it such as the hydraulic head, the output power or the opening of the guide vanes. These control circuits can use digital models of the hydraulic unit.

The energy storage system 14 of this embodiment can include an energy storage device selected in the group comprised of a supercapacitor, a fuel cell, an electrochemical battery, an electrical motor driving a flywheel, an air compressor, and an electromagnetic storage. AC/DC converters 11 and 12 can include a rectifier for the conversion between an alternative voltage of a three-phase network and a DC voltage.

The AC/DC converter 11 and the AC/DC converter 12 are configured to be reversible in current. The converters 11 and 12 are voltage source inverters (VSI). For one mode of the control circuit 16, the power is transferred from the AC interface of the AC/DC converter 11 to the DC interface of the AC/DC converter 11 and in another mode of the control circuit 16, the power is transferred from the DC interface of the AC/DC converter 11 to the AC interface of the AC/DC converter 11. For one mode of the control circuit 17, the power is transferred from the DC interface of the AC/DC converter 12 to the AC interface of the AC/DC converter 12 and in another mode of the control circuit 17, the power is transferred from the AC interface of the AC/DC converter 12 to the DC interface of the AC/DC converter 12.

FIG. 2 is a schematic representation of a power transfer system 1 according to a second embodiment of the invention. This embodiment only differs from the embodiment of FIG. 1 by the structure of the energy storage system 14. In this embodiment, the converters 11 and 12 can be voltage source inverters. The energy storage system 14 includes a DC/DC converter 141 and an energy storage device 142 used as an electrical transducer into another form of energy. The DC/DC converter 141 electrically connects the storage device 142 and the controlled switch 15. The DC/DC converter 141 is configured to adapt the voltage level between the storage device 142 and the DC link 13. The energy storage system 14 includes a control circuit 143 configured to control the DC/DC converter 141. The control circuit 143 controls the switches belonging to the DC/DC converter 141. The control circuit 143 can receive information related to the DC-link 13, such as current and voltage. The control circuit 143 can also receive information related to the storage device 142, such as its output voltage or its state of charge. The energy storage device 142 of this embodiment can be selected in the group comprised of a supercapacitor, a fuel cell, an electrochemical battery, an electrical motor driving a flywheel, an air compressor, and an electromagnetic storage.

Controllers 16 and 17 can advantageously receive information related to the state of the hydraulic unit and of the energy storage system 14, such as the production mode, the state of charge and health of the energy storage system 14, the water head in the reservoirs or the opening of the wicket gates of the hydraulic unit. They can also receive information related to the DC-link 13, such as current or voltage. The controllers 16 and 17 can advantageously send or receive information to and from each other. They can be based on a Model Predictive Control approach.

In the example of FIG. 2, the converters 11 and 12 can also be current source inverters (CSI). The voltage of the DC-link 13 can be reversed. The DC/DC converter 141 is reversible. Advantageously, the DC/DC converter (141) is a two-quadrant converter.

The DC-link 13 can include two windings, the first winding 1311 being located between the converter 11 and the switch 15, the second winding 1312 being located between the converter 12 and the switch 15.

FIG. 3 illustrates one operating mode of the power transfer system 1 according to the first embodiment, during a starting phase of the reversible pump-turbine 3 in pump mode. In this operating mode, the control circuit 7 simultaneously opens the switch 41 of the main branch 4 in order to transfer electrical power from the AC interface 61 to the AC interface 62 with an increasing frequency on the AC interface 62, until it reaches the frequency on the interface 61. The control circuit 7 also opens switch 15 of the secondary branch 8, so that the energy storage system 14 is not used during for power transfer.

FIG. 4 illustrates another operating mode of the power transfer system 1 according to the first embodiment. The pump-turbine 3 is used in turbine mode to transfer power to the AC network 2. The pump-turbine 3 is driven here at a rotation speed that differs from the frequency of the AC network 2. In this operating mode, the control circuit 7 simultaneously opens the switch 41 of the main branch 4 order to transfer electrical power generated by the reversible pump-turbine 3 from the AC interface 62 to the AC interface 61 when the frequencies on the AC interface 62 and on the AC interface 61 are different. The control circuit 7 also opens switch 15 of the secondary branch 8, so that the energy storage system 14 is not used during for power transfer.

FIG. 5 illustrates another operating mode of a power transfer system 1 according to the first embodiment. In this operating mode, the control circuit 7 simultaneously opens the switch 41 of the main branch 4 and closes the switch 15 of the secondary branch 8. The control circuit 7 drives a power transfer from the energy storage system 14 to the AC network 2 through converter 11 in order to provide transitorily power to this AC network 2. The control circuit 7 also drives a power transfer from the energy storage system 14 to the pump-turbine 3, with a variable (here increasing) frequency. Once the frequency on the AC interfaces 61 and 62 are equal, the control circuit 7 can close the switch 41 to optimize the power transfer between the AC network 2 and the pump-turbine 3.

To reduce the starting phase duration, the control circuit 7 can also drive a power transfer from the AC network 2 to the pump-turbine 3 through the converters 11 and 12 and a power transfer from the energy storage system 14 to the pump-turbine 3 through converter 12, with an increasing frequency, in order to start the pump-turbine 3 in pump mode.

FIG. 6 illustrates another operating mode of a power transfer system 1 according to the first embodiment. In this operating mode, the control circuit 7 simultaneously closes the switch 41 of the main branch 4 and closes the switch 15 of the secondary branch 8. The energy storage system 14 transfers power to the AC network 2 through the AC interface 61. The energy storage system 14 can also transfer power to the AC network 2 through the AC interface 62. The reversible pump-turbine 3 transfers power to the AC network 2 through the switch 41 of the main branch 4. The energy storage system 14 can thereby transitorily provide power to the AC network 2 in addition to the power generated by the pump-turbine 3, in order to meet a transient increased power production on the AC network 2. The energy storage system 14 allows a more dynamic power adaptation on the AC network 2 than the pump-turbine 3 would allow.

If the power consumption on the AC network 2 is transitorily lowered, the power flows can be inverted in this operating mode where both switches 41 and 15 are closed. The energy storage system 14 receives power from the pump-turbine 3 through the AC interface 62. The energy storage system 14 can also receive power from the pump-turbine 3 through the AC interface 61. The reversible pump-turbine 3 also transfers power to the AC network 2 through the switch 41 of the main branch 4.

In one embodiment, the energy storage system 14 has a maximal power comprised between the maximal power of converter 11 or converter 12 and the sum of the power of converters 11 and 12. The power transfer from energy storage system 14 to the network 2 is higher than the power transfer allowed by the converter 11 or the converter 12. With this architecture, the power transfer system 1 can allow a more powerful energy storage system 14 than with the use of one only converter AC/DC connected between connection interface 61 or 62 and the energy storage system 14.

FIG. 7 is a schematic representation of a power transfer system 1 according to an independent aspect of the invention. The power transfer system 1 includes a controlled switch 41, a variable frequency converter 5, a connection interface 61 and another connection interface 62. A power link includes a main power branch 4 and a secondary power branch 8. The power branches 4 and 8 are connected in parallel between the connection interfaces 61 and 62. Branch 4 includes the controlled switch 41. Switch 41 can be a HVAC circuit breaker. Branch 8 comprises the variable frequency converter 5. The connection interface 61 is here connected to an AC network 2, typically a 3 phased AC network. The connection interface 62 is here connected to a pump-turbine 3, including typically a synchronous motor/generator.

The variable frequency converter 5 includes an AC/DC converter 11, a DC link 13 and another AC/DC converter 12. The AC interface of the AC/DC converter 11 is connected to the connection interface 61 through a transformer 81. The AC interface of the AC/DC converter 12 is connected to the connection interface 62 through a transformer 82. Transformers 81 and 82 are configured to adapt the voltage on the connection interfaces 61 and 62 to the AC interfaces of converters 11 and 12. For instance, transformers 81 and 82 can perform a 15 kV to 3 kV voltage conversion.

The power transfer system 1 comprises an energy storage system 14 and an AC/DC converter 18. The energy storage system 14 is connected to the DC interface of the converter 18. The AC interface of the converter 18 is connected between transformer 81 and converter 11. The AC interface of the converter 18 is also connected between transformer 82 and converter 12. In the embodiment illustrated here, a controlled switch selectively connects the converter 18 and the energy storage system 14.

A control circuit 7 can control the power transfer between the energy storage system 14 and the connection interfaces 61 and 62. The control circuit 7 can also control the switching of switch 41.

The control circuit 7 therefore controls the power transfer through the main branch 4, and the power transfer from/to the energy storage system 14. The main switch 41 allows to selectively connect/disconnect the AC interfaces 61 and 62 of the AC/DC converters 11 and 12, or the power interface of the motor of the pump-turbine 3 and the AC network 2.

The control circuit 7 notably has a control mode wherein it simultaneously opens the switch 41 of the main branch 4 and it transfers electrical power from the AC interface 61 to the AC interface 62 through the secondary branch 8, with an increasing frequency on the AC interface 62, until it reaches the frequency on the interface 61. The control circuit 7 also has another control mode wherein it closes the switch 41 of the main branch 4 to allow a power transfer between the AC network 2 and the pump-turbine 3.

With this architecture, the power transfer system 1 can also allow a cost reduction for the energy storage system 14. Indeed, given the converter 18 is connected to a lower voltage than that of the connection interfaces 61 and 62, its cost be reduced.

The energy storage system 14 of this embodiment can include an energy storage device selected in the group comprised of a supercapacitor, a fuel cell, an electrochemical battery, an electrical motor driving a flywheel, an air compressor, and an electromagnetic storage. AC/DC converters 11 and 12 can include a rectifier for the conversion between an alternative voltage of a three-phase network and a DC voltage.

The AC/DC converters 11 and 12 are here reversible in current. The DC link 13 electrically connects the respective DC interfaces of the AC/DC converters 11 and 12, to allow a power transfer between these DC interfaces.

The AC/DC converters 11 and 12 are reversible in current. The DC link 13 electrically connects the respective DC interfaces of the AC/DC converters 11 and 12, to allow a power transfer between these DC interfaces.

In the embodiments of FIGS. 8 to 12, the converters 11 and 12 are current source inverters (CSI). In these embodiments, the converters 11 and 12 are unidirectional in current but bidirectional in voltage. The converters 11 and 12 can be two-quadrant converters. In these embodiments, the DC link 13 includes two DC conductors 131 and 132. The conductor 131 is connected between one port or pole of the DC interface of the converter 11 and one port or pole of the DC interface of the converter 12. The conductor 132 is connected between another port or pole of the DC interface of the converter 11 and another port or pole of the DC interface of the converter 12.

The energy storage system 14 is series connected on the conductor 132. The controlled switch 15 selectively connects the energy storage system 14 to the conductor 132. The switch 15 is controlled by the control circuit 7.

The energy storage system 14 includes a DC/DC converter 141 and an energy storage device 142 used as an electrical transducer into another form of energy. The DC/DC converter 141 electrically connects the storage device 142 and the conductor 132. The DC/DC converter 141 is configured to adapt the voltage level between the storage device 142 and the conductor 132. The energy storage system 14 includes a control circuit 1400 configured to control the DC/DC converter 141. The control circuit 1400 and the storage device 142 can be similar to the example described with reference to FIG. 2.

One inductor 133 is also series connected on the conductor 131.

Thanks to this structure, the embodiments of FIGS. 8 to 15 are unidirectional in current and bidirectional in voltage on the DC link 13. FIGS. 9 to 11 illustrate different operation modes of the embodiment of FIG. 8, to highlight the advantages of this embodiment. The arrows associated with the links to the connexion interfaces 61 and 62 illustrate the power flows between the converters 11, 12 and the connexion interfaces 61, 62 respectively.

According to the first operation mode illustrated at FIG. 9, the energy storage device 14 and the converters 11 and 12 are operated to have current flow on the bus 131 from converter 11 to converter 12, and to maintain the same voltage on the DC interfaces of converters 11 and 12. The voltage on conductor 131 is higher than the voltage on conductor 132. Electrical power is thereby drawn from the connexion interface 61 by converter 11 and transferred to the connexion interface 62 by converter 12.

According to the second operation mode illustrated at FIG. 10, the energy storage device 14 and the converters 11 and 12 are operated to have current flow on the conductor 131 from converter 11 to converter 12, and to maintain the same voltage on the DC interfaces of converters 11 and 12. The voltage on conductor 132 is higher than the voltage on conductor 131. Electrical power is thereby drawn from the connexion interface 62 by converter 12 and transferred to the connexion interface 61 by converter 11.

According to the third operation mode illustrated at FIG. 11, the energy storage device 14 and the converters 11 and 12 are operated to have current flow on the conductor 131 from converter 11 to converter 12, and to maintain opposite voltages on the DC interfaces of converters 11 and 12. Electrical power is thereby transferred to the connexion interface 62 by converter 12 and transferred to the connexion interface 61 by converter 11.

Thanks to this design based on the combination of the series connection of:
- the energy storage system 14 between respective DC ports of the converters 11 and 12,
- the converters 11 and 12 being current source inverters, the corresponding power transfer system 1 can keep the same structure of the converters 11 and 12 to avoid a cost increase while providing independent power flows from the energy storage system 14 with the AC interfaces 61 and 62.

In the above examples of converters 11 and 12 being current source inverters combined with series connected energy storage systems 14, the switch 15 is highlighted as an independent component. However, the switch 15 can be integrated in the energy storage system 14, and in particular in its DC/DC converter 141. The switch 15 can be a switching transistor or a controlled mechanical circuit breaker.

FIG. 12 is an improvement of the embodiment of FIG. 8. This improvement provides the same features as the embodiment of FIG. 8, except the structure of the energy storage device 14. In its third operation mode explained with reference to FIG. 11, the voltage applied to the energy storage device is twice the nominal voltage U applied between the ports of the converters 11 and 12. To withstand this increased voltage while keeping a feasible solution and a reasonable price for the energy storage device 14, the energy storage device 14 is split into several modules. Each module comprises its own DC/DC converter 141 and its own storage device 142. The DC/DC converters are series connected on the conductor 132.

FIG. 13 illustrates the a first possible structure of a DC/DC converter 141 usable for an energy storage device 14 embedded in the third embodiment. This DC/DC converter 141 comprises an H bridge connected to the poles of the storage device 142. Two poles of the H-bridge are connected to series connections 143 and 144. The H-Bridge is provided with transistors (IGBTs on this example) 145 and 145 and with diodes 147 and 148 in a structure known per se.

FIG. 14 illustrates a second possible structure of a DC/DC converter 141 usable for an energy storage device 14 embedded in the third embodiment. In addition to the H-bridge highlighted at FIG. 13, the converter 141 further comprises a capacitor 140 and an inductor 149. A branch includes the storage device 142 and the inductor 149 connected in series. This branch is connected in parallel to a branch including the capacitor 140, in order to smoothen the modulated current that flows through the storage device 142 due to switching actions.

FIG. 15 illustrates a further structure of a DC/DC converter 141 usable for an energy storage device 14 embedded in the third embodiment. To isolate the storage device 142, the DC/DC converter 141 includes a transformer 1412 interconnected between a DC/AC converter 1411 and another DC/AC converter 1413.

FIG. 16 is an improvement of the embodiment of FIG. 12. This improvement provides the same features as the embodiment of FIG. 8, except the structure of the energy storage device 14. Additionally, the conductor 132 comprises a bypassing branch, including a switch 151. This branch allows to bypass the energy storage device 14 when it is not in use. Additionally, the switch 15 allows the disconnection of the energy storage device 14, for instance to perform maintenance or upgrading operations. Additionally, each energy storage module is provided with a bypassing switch 152. Such a bypassing switch 152 may be closed when the corresponding energy storage 142 or its DC/DC converter is out of order.

FIG. 17 shows an energy storage device 14 connected between the conductors 131 and 132 of the DC link 13 through the switch 15. This energy storage device 14 is connected in parallel to a smoothing capacitor 19.

FIG. 18 shows an energy storage device 14 that can be selectively series connected on the conductor 132. This energy storage device 14 is connected in a H-bridge switching structure 150. The switching structure 150 comprises switches 1501, 1502, 1503 and 1504. One node of the switching structure 150 can be selectively connected to earth by a switch 1505. The H-bridge switching structure 150 is connected to poles of the energy storage device 14. Two poles of the H-bridge are connected to series connections of the conductor 132.

Additionally, the conductor 132 comprises a bypassing branch, including a switch 151. This branch allows to bypass the energy storage device 14 when it is not in use. When switches 1501 and 1504 are closed, the energy storage device 14 is discharged. When switches 1502 and 1503 are closed, the energy storage device 14 is charged. When switches 1501 and 1503 are closed, the energy storage device 14 is bypassed.

The invention was described previously with a power transfer system 1 including a reversible pump-turbine 3. According to another aspect invention, the pump-turbine 3 disclosed previously in combination with other components can be replaced by another kind of turbine coupled to a rotor of a generator by a shaft, for instance a gas turbine or a vapor turbine.

The invention claimed is:

1. A power transfer system, comprising: a first branch and a second branch connected in parallel between a first connection interface configured to be connected to an AC network and a second interface configured to be connected to a reversible pump-turbine, the first branch comprising a controlled switch, the second branch comprising a variable frequency converter, the variable frequency converter comprising:
a first AC/DC converter having a first AC interface connected to the first connection interface and a first DC interface, and
a second AC/DC converter having a second AC interface connected to the second connection interface and a second DC interface, the first and second DC interfaces being connected by a DC link,
a control circuit having a first mode wherein the control circuit simultaneously opens the switch of the first branch and transfers electrical power from the first AC interface to the second AC interface with an increasing frequency on the second AC interface until a frequency on the first interface is reached, and having a second mode wherein it closes the switch of the first branch;
the system further comprises an energy storage system connected to the DC link; and
a switching system controlled by the control circuit for selectively connecting the energy storage system to the DC link,
wherein the energy storage system includes a DC electrical transducer and a DC/DC converter,
wherein the DC electrical transducer comprises an energy storage device selected in a group consisting of a supercapacitor, a fuel cell, an electrochemical battery, an electrical motor driving a flywheel, an air compressor, and an electromagnetic storage,
wherein the energy storage device is configured to convert electrical energy to another form of energy,
wherein the first and second AC/DC converters are current source inverters, and wherein the DC/DC converter is a two-quadrant DC/DC converter, wherein the DC link comprises a first conductor connected between respective first ports of the first and second AC/DC converters and a second conductor connected between respective second ports of the first and second AC/DC converters, the DC/DC converter being series connected on the second conductor.

2. The power transfer system according to claim 1, wherein the DC/DC converter is configured to change the voltage level between the DC electrical transducer and the DC link.

3. The power transfer system according to claim 1, wherein the DC electrical transducer is one of a supercapacitor, a fuel cell, an electrochemical battery an air compressor, and an electromagnetic storage.

4. The power transfer system according to claim 1, wherein the first AC/DC converter and the second AC/DC converter are bidirectional.

5. The power transfer system according to claim 1, wherein the first and second AC/DC converters are current source inverters, and wherein the DC/DC converter is a two-quadrant DC/DC converter.

6. The power transfer system according to claim 5, wherein the DC-Link includes a first winding connected between the first DC interface and the switching system and a second winding connected between the second DC interface and the switching system.

7. The power transfer system according to claim 1, further comprising several two-quadrant DC/DC converters connected in series on the second conductor and comprising DC electrical transducers connected to respective two-quadrant DC/DC converters.

8. The power transfer system according to claim 1, wherein the first and second AC/DC converters are two voltage source inverters and wherein the DC/DC converter is reversible in power.

9. The power transfer system according to claim 1, wherein nominal powers of the first AC/DC converter and of the second AC/DC converter are lower than 20% of the nominal power of the first switch.

10. The power transfer system according to claim 1, wherein the energy storage system (is configured to provide a maximal power higher than the maximal power of the first AC/DC converter and higher than the maximal power of the second AC/DC converter, and lower than the sum of power of the first and second AC/DC converters.

11. A hydraulic system, comprising:
a power transfer system according to claim 1,
an AC network connected to the first connection interface of the power transfer system; and
a reversible pump-turbine connected to the second connection interface of the power transfer system.

12. A method for managing a power transfer system, the power transfer system comprising a first branch and a second branch connected in parallel between a first connection interface to be connected to an AC network and a second interface to be connected to a reversible pump-turbine, the first branch comprising a controlled switch, the second branch comprising a variable frequency converter, the variable frequency converter comprising:
a first AC/DC converter having a first AC interface connected to the first connection interface and a first DC interface, and
a second AC/DC converter having a second AC interface connected to the second connection interface and a second DC interface, the first and second DC interfaces being connected by a DC link;
an energy storage system connected to the DC link and a switching system controlled for selectively connecting the energy storage system to the DC link;
the method comprising the steps of:
in a first mode, simultaneously opening the switch of the first branch and transferring electrical power from the first AC interface to the second AC interface with an increasing frequency on the second AC interface until the frequency on the second AC interface reaches the frequency on the first interface; and
in a second mode, closing the switch of the first branch and connecting the energy storage system to the DC link,
wherein the energy storage system includes a DC electrical transducer and a DC/DC converter,
wherein the first and second AC/DC converters are current source inverters, and wherein the DC/DC converter is a two-quadrant DC/DC converter, wherein the DC link comprises a first conductor connected between respective first ports of the first and second AC/DC converters and a second conductor connected between respective second ports of the first and second AC/DC converters, the DC/DC converter being series connected on the second conductor.

13. The method for managing a power transfer system according to claim 12, wherein the power transfer system is operated to provide a maximal power higher than the maximal power of the first AC/DC converter and higher than the maximal power of the second AC/DC converter, and lower than the sum of power of the first and second AC/DC converters.

* * * * *